July 21, 1970  H. J. KNAPP  3,521,552
ENDLESS CAUL BELT CONTINUOUS PRESS
Filed July 29, 1968  5 Sheets-Sheet 1
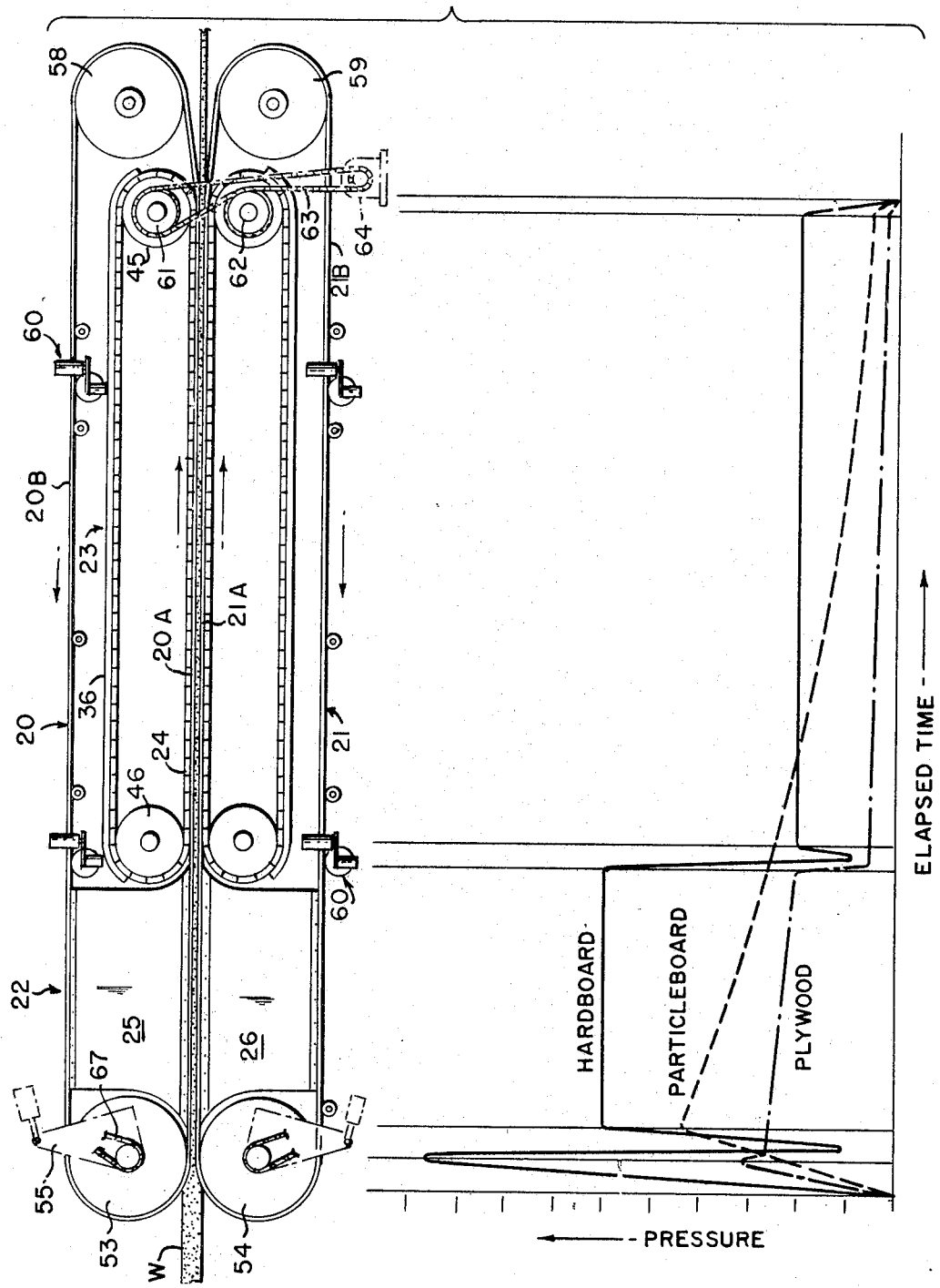
FIG_1
HANS JOHN KNAPP
INVENTOR.
BY
ATTORNEYS

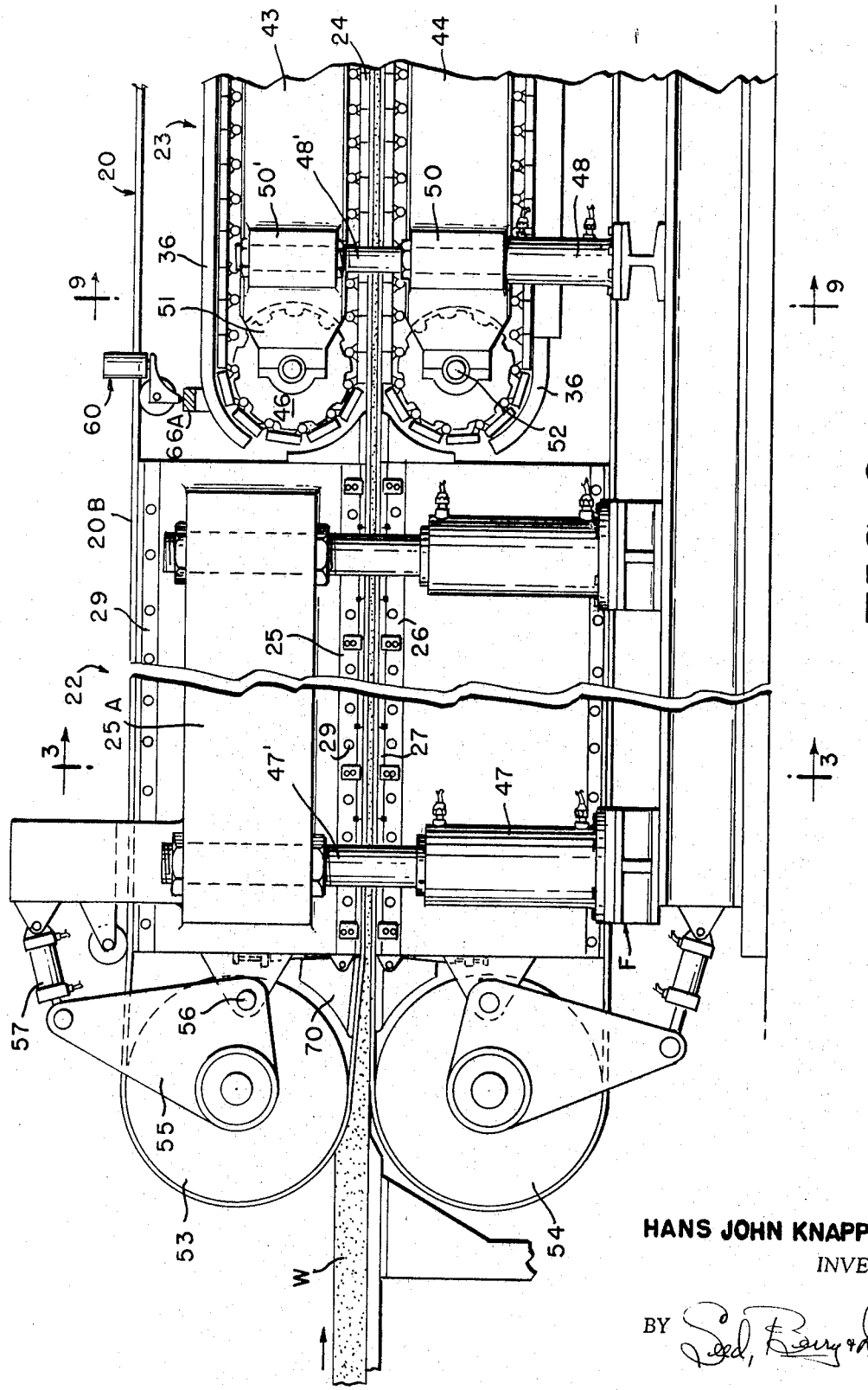

FIG_3
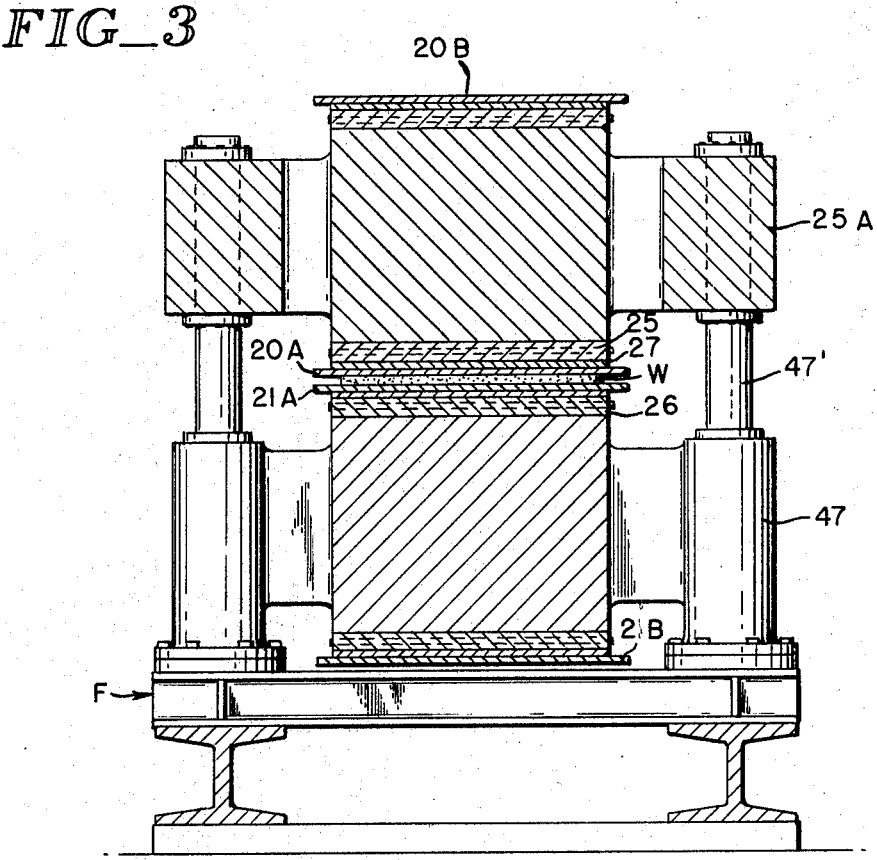
FIG_4
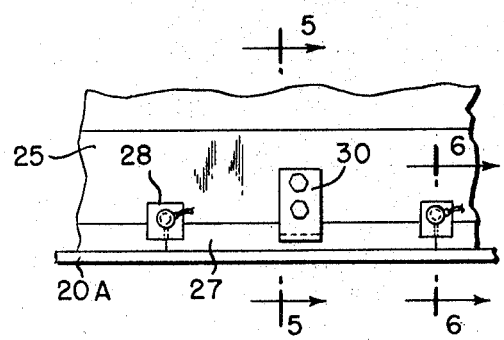
FIG_5
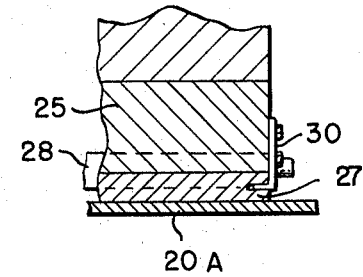
HANS JOHN KNAPP
INVENTOR.
ATTORNEYS July 21, 1970 H. J. KNAPP 3,521,552
ENDLESS CAUL BELT CONTINUOUS PRESS
Filed July 29, 1968 5 Sheets-Sheet 4
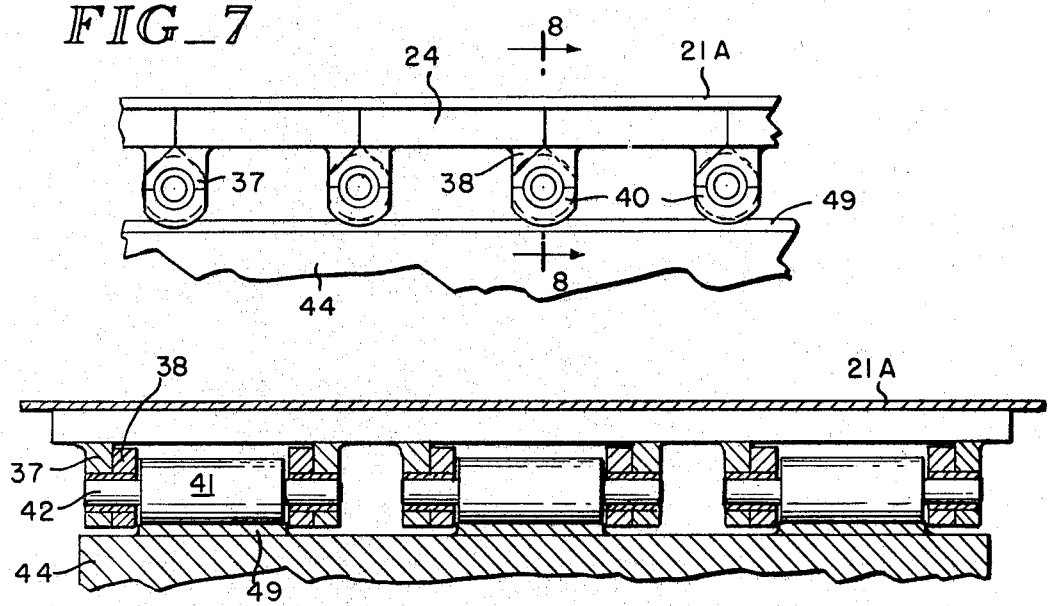
FIG_7
FIG_8
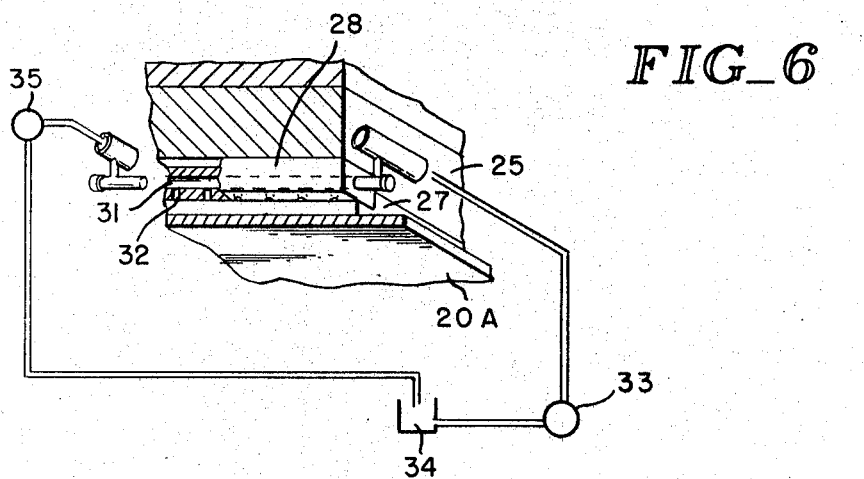
FIG_6
HANS JOHN KNAPP
INVENTOR.
BY
ATTORNEYS

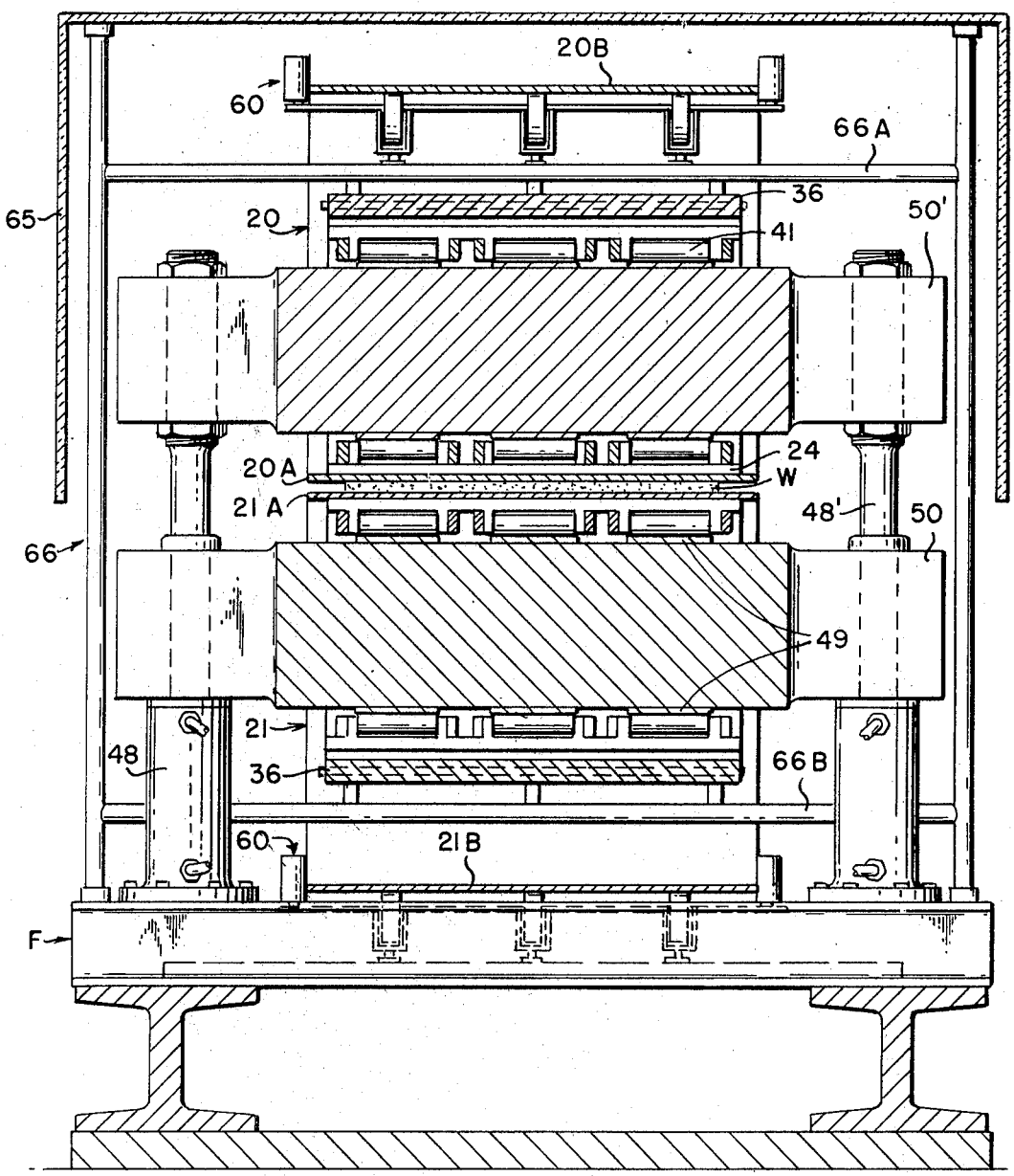
FIG_9

United States Patent Office 3,521,552
Patented July 21, 1970

3,521,552
ENDLESS CAUL BELT CONTINUOUS PRESS
Hans John Knapp, 2035 SW. 58th Ave.,
Portland, Oreg. 87221
Filed July 29, 1968, Ser. No. 748,499
Int. Cl. B30b 5/06
U.S. Cl. 100—93
14 Claims

ABSTRACT OF THE DISCLOSURE

A multi-stage continuous press of the endless caul belt type is provided in which the tensile forces in the linear squeezing run exerted by the frictional loading of a stationary press section to exert a first pressure are isolated in the squeezing run rather than being added to the tensile component of the bending stress at the return loops of the belts, and in which pretensioning of the belts is not required. This is accomplished by opposed caterpillars along the squeezing run having flat platen links which frictionally pull the caul belts through the stationary press section and at the same time exert a squeezing pressure with a second pressure. The platens of the stationary press section are faced with a solid lubricant to which a liquid is applied having the property of decreasing the friction between the solid lubricant and the caul belts without effecting the coefficient of friction between the platen links of the caterpillars and the caul belts.

---

To date continuous presses of the endless caul belt type for use in the production of particle board, fiberboard, plywood and similar products have in the main not been technically and economically feasible. In this type of press the work is conveyed by and pressed and heated between opposed runs of a pair of steel belts. Backing pressure has been applied to these runs through stationary platens (Pat. 2,981,307), caterpillar tracks (Pat. 2,602,960), or roller tracks (Pat. 2,720,231) which are heated. In the platen and roller backed units the caul belts are driven by driving drums located at the end of the work run whereas in the caterpillar track backed unit the track is power driven and in turn drives the caul belt by frictional engagement. Usually the backing means is adjustable to vary the gap between the caul belts and is hydraulically loaded.

Stationary platen backing of the caul belts has in the past presented a frictional loading problem between the belts and the platens which is compounded by the bending stresses on the belts at the driving drums and the required pretensioning of the belts with the result that the press capabilities are seriously limited by the ultimate strength of the belt steel even though construction of this style of press is theoretically the most economical. The roller track style of backing greatly reduces this frictional loading factor but does not give a continuous backing support for the caul belts because of the gaps between the roller contact lines, and this results in an undulating rather than a constant pressure on the work.

The caterpillar type backing places the least stress in the caul belts because the bending stress is minimal, pretensioning is not required, and there is no relative motion between the respective runs of the belts and caterpillar tracks. As a result to date this has been the most successful type of unit. However, it has been limited from an economic standpoint by the enormity of size required to operate at the high pressures required for the manufacture of hardboard and particle board. Furthermore, it suffers from the high temperature requirement for the curing process with its degrading effect on lubrication, bushings and bearings.

As a consequence of the above problems and limitations in continuous presses and important technological advances in the design of multi-platen vertical presses, particularly the advent of simultaneous platen closing mechanisms and automated charging and unloading systems, vertical presses have taken the market even though handicapped in theory by a loading and unloading period and platen closing and opening periods in their operating cycle not present in a continuous pressing operation. In the present state of the multi-platen press art the shortest feasible press cycle is about 3 minutes, whereas hardboard curing cycles, for example, are available in the order of 1 minute.

The present invention aims to provide a continuous press which can take advantage of the available curing cycles shorter than the minimum multi-platen press cycle and at the same time be constructed and operated at costs at least competitive with those encountered with multi-platen pressing.

A further object is to provide an improved continuous press which makes the full ultimate tensile strength (less normal safety factor) of the caul belt material available for high pressure frictional loading, i.e. which eliminates the need for pretensioning of the belt and isolates the tensile loading of the belts due to the friction load from the tensile component of the bending stress requisite in the return loops of the belt.

Another important object of the invention is to provide a continuous press in which multiple variable pressure and/or temperature zones are available for carrying out various curing cycles.

A further object is to provide a means of reducing the frictional drag of stationary platens acting on the caul belts without at the same time reducing the friction available in the driving zone of the belts.

Other more particular objects and advantages of the invention will, with the foregoing, appear and be understood in the course of the following description and claims, the invention consisting in the novel construction and in the adaptation and combination of parts hereinafter described and claimed.

In the accompanying drawings:

FIG. 1 is a semi-diagrammatic side elevation view of a continuous press embodying the present invention and showing typical press cycles for hardboard, particle board and plywood with their stages correlated with the corresponding press sections;

FIG. 2 is a fragmentary side elevational of the press;

FIG. 3 is a vertical sectional view taken as indicated by the line 3—3 of FIG. 2;

FIG. 4 is a detail side elevational view of part of the upper platen of the stationary press section;

FIG. 5 is a fragmentary vertical sectional view taken along line 5—5 of FIG. 4;

FIG. 6 is a perspective diagrammatic view, partly in transverse vertical cross-section, illustrating the system for applying liquid between the solid lubricant face of the platens of the stationary press sections and the back of the caul belts;

FIG. 7 is a detail fragmentary side elevational view of a portion of the track of the caterpillar press section;

FIG. 8 is a transverse vertical sectional view taken along the line 8—8 of FIG. 7; and FIG. 9 is an enlarged transverse vertical sectional view through the caterpillar press section and taken as indicated by the line 9—9 of FIG. 2, and showing an overhead heat retaining shroud structure not shown in the other views.

Referring to the drawings, it is seen that a pair of endless caul belts 20–21 are arranged with opposed linear squeezing runs 20A–21A moving in the same direction to function as a continuous press while conveying material therebetween such, for example, as a continuous web W of hardboard, particle board, plywood, etc. While traversing these squeezing runs the caul belts move through a stationary press section 22 for a first compression stage and then pass through a caterpillar press section 23 which frictionally drives the caul belts by its moving platens 24 as well as performing a second compression stage normally at a reduced pressure relative to the first stage. The term "stationary" as applied to the press section 22 is intended to mean that the squeezing runs of the caul belts move relative to the opposed platens 25–26 of this press section, and is not intended to imply that these platens do not move relative to one another.

Basic to the present invention is the fact that the frictional driving force of the caterpillars of the press section 23 is made sufficient to overcome the frictional drag on the back of the caul belts created by the platens 25–26 of the stationary press section 22. Of considerable importance in this regard is the fact that as part of the present invention the coefficient of friction as between the caul belts and the platens of the stationary press is made significantly smaller than the coefficient of friction between the caul belts and the caterpillar platens 24. This makes it possible for the caterpillar press section 23 of the continuous press to be proportionally shorter than would be otherwise necessary in order to overcome the drag of the stationary press section 22 and hence makes it possible to provide a multiple stage press in which both the pressures and time durations of the various stages can be varied independently of one another to conform with the desired pressing cycle of the materials to be processed.

By the present invention the stresses in the caul belts 20–21 created by frictional load of the stationary press section are confined to tensional forces present only in the squeezing run of the belts and graduating to zero at the outfeed end of the caterpillar press section. Thus the caul belts are freed of any pretensioning requirements and the bending stresses created in the end loops of the return path 20B–21B of the caul belts are isolated, thereby increasing the tension capability in the squeezing run portion of the belts approximately threefold over those in conventional friction presses. Furthermore, the return portion of each caul belt path can be in a slack condition thereby greatly simplifying the return guiding requirements.

The aforementioned frictional coefficient differential between the platens of the stationary and caterpillar sections of the press and the caul belts is obtained by facing the stationary platens 25–26 with a solid lubricant 27 and wetting between this solid lubricant and the back of the belts with a heat stable liquid having the property of further decreasing the coefficient of friction between the solid lubricant and the back of the caul belts without at the same time reducing the metal-to-metal coefficient of friction as between the wetted back of the caul belts and the caterpillar platens 24. The solid lubricant can be graphite or molybdenum disulphide, or combinations thereof, carried in a suitable thermosetting binder and cured under heat and pressure into panels, or a suitable compound containing fluorocarbon tetra fluoroethylene, while the heat stable fluid can be selected from any of a large group of polymerized organic siloxanes such as dimethylpolysiloxane, methylpolysiloxane, and phenylpolysiloxane.

The solid lubricant panels 27 serving as the facings of the platens 25–26 for the stationary press section 22 extend the width of the platens and are milled along the back of their meeting edges to receive keys 28. These keys are in turn fitted into parallel slots formed in the platens proper at cross angles to the squeezing run of the caul belts to prevent shifting of the panels in the travel direction of the squeezing run. L-shaped hangers 30 bolted to the lateral ends of the platens 25–26 and interfitting with side slots in the panels 27, as shown in FIG. 5, hold the panels against the platens during assembly and under no-load conditions, and prevent lateral endwise movement of the panels relative to the platens.

As shown in FIG. 6, the keys 28 may be formed with longitudinal center bores 31 intersected by a series of ports 32 opening to the joints between the panels. These center bores are connected at one end to a supply manifold fed under pressure with the aforedescribed lubricating liquid by a pump 33 drawing suction from a supply tank 34. A return manifold to this tank leads from the other end of the key bores and is provided with a back pressure regulator 35. With this arrangement the fluid lubricant is caused to weep between the joints of the panels 27 onto the back of the caul belts. This weeping can be made continuous or intermittent.

The platens 25–26 of the stationary press section 22 are heated internally in any suitable manner well known in the art such as by steam through tubes 29 or metal-sheathed electrical resistance heaters. Heat is applied in both the top and bottom portions of the platens to prevent thermal distortion. When heating of the caterpillar platens 24 is desired banks of radiant panels 36 facing the return runs of the caterpillars are utilized.

Directing attention to FIGS. 7 and 8 the caterpillar platens 24 comprise flat links each cast with two sets of integral ears 37, 38 which are offset with respect to one another so as to register with those of the adjoining platens. The link ears have split bearing caps 40 to permit easy removal of guide rollers 41 formed with integral gudgeons 42 journaled in the link ears. These rollers track against rigid upper and lower backing rails 43–44 paralleling the squeezing rungs and interfit with the teeth of the driving and idler sprockets 45–46 of the caterpillars. Replaceable wear plates 49 for the rollers 41 may be provided on the backing rails.

The lower platen 26 of the stationary press section 22 is provided with rigid outriggers formed with hydraulic cylinders 47 which are anchored to a base frame F. These cylinders are complemented by hydraulic cylinders 48 for the caterpillar section onto which outriggers 50 of the lower backing rail 44 are fixedly seated. Similarly, the upper platen 25 and upper backing rail 43 have rigid lateral extensions 25a, 50' and these together with the lower outriggers 50 are vertically bored to receive the respective piston rods 47'–48' of the hydraulic cylinders 47–48. The two press sections 22–23 have independent hydraulic systems so that the upper platen 25 of the stationary press section 22 and the upper backing rail 43 of the caterpillar press section 23 can be independently adjusted and loaded relative to one another and adjusted relative to their stationary lower complements 26, 44.

To journal mount the caterpillar sprockets 45–46 the upper and lower backing rails 43–44 are provided with pairs of end extensions 51 fitted with suitable bearings 52. The tail sprockets 46 may be adjustable (not shown) endwise of the backing rails to adjust the tensioning of the chains comprising the platen links.

At the lead-in end of the continuous press there is provided a pair of infeed guide rolls 53–54 for the caul belts which are preferably adjustable so as to be available for use as pinch rolls in certain applications. These rolls are journaled between pairs of rocker arms 55 pivotally mounted at 56 on the upper and lower platens 25–26 of the stationary press section 22. The infeed clearance between the guide rolls can be adjusted by hydraulic cylinders 57 working on extensions of the rocker arms. At the outfeed end of the press the caul belts 20–21 may be guided into their return run by guide rolls 58–59 or by a series of rollers. Along the return runs 20B–21B self-alining belt guide assemblies 60 are provided.

The caterpillars of the caterpillar press section 23 are driven at the same speed from a common drive. For example, as shown in FIG. 1, a pair of drive sprockets 61–62 may be keyed to shaft extensions of the caterpillar sprockets 45 at the outfeed end and driven by a chain 63 from a power source 64. In such a case the chain 63 is looped over the top of the upper sprocket 61 and around the outfeed side of the lower sprocket 62 so as to drive the sprockets in opposite directions in order that the squeezing runs of the caterpillars will both run in the same direction.

As shown in FIG. 9, an upper shroud 65 may be provided to minimize heat losses and is supported by frame sections 66 at intervals of its length. These frame sections provide laterals 66a–66b to carry the upper guide assemblies 60 and the upper and lower heating units 36.

Directing attention to FIG. 1 there is illustrated typical pressure/time diagrams for hardboard, particle board and plywood cycles which approximate those performed by multi-platen press techniques. In the typical hardboard cycle there is a precompression of the mat performed by a continuous precompressor which would be located at the head end of the continuous press of the present invention. After such precompression the mat is consolidated at high pressure momentarily and then reduced, with or without a momentary breathing stage shown in the diagram, to an intermediate curing pressure. This is followed by a lower holding pressure which is slightly in excess of the water vapor pressure corresponding to the temperature within the board, and a momentary breathing stage may be provided immediately ahead of this holding stage. As indicated in FIG. 1 the high pressure consolidation stage is accomplished by the nip of the lead-in rolls 53–54 which are suitably adjusted, and the first breathing stage is determined by the gap between the lead-in rolls and the stationary platens 25–26. The intermediate pressure stage is accomplished by the stationary press section 22 and the second breathing stage is performed by the gap between the stationary and caterpillar sections. Lastly, the holding stage is provided by the caterpillar section 23. Since the heating sources in the stationary and caterpillar sections are independent, a lower temperature may be used in the caterpillar section if desired for humidity control. Such a two-stage temperature cycle is not economically feasible in present multi-platen presses.

The rolls 53–54 may be given an independent drive as indicated at 67 in FIG. 1 to provide additional power consumed when they are used as nip rolls. This supplemental drive is also of assistance in feeding in the web W during initial starting of the press.

In one-half inch or under particle board no precompression is normally used before the main pressing cycle. When using a multi-platen press the press is normally closed to a fixed gap hydraulically. Then as the particle board cure proceeds proportionally less pressure is required to hold the board thickness. When using the present invention for curing particle board the gap between the caul belts 20–21 is held constant either by hydraulically forcing the upper stationary platen 25 and upper backing rail 43 against preset stops or by automatically monitoring the gap and adjusting the hydraulic pressure to maintain the gap similarly to the existing multi-platen control systems. At the infeed end of the continuous press the upper infeed roll 53 is raised above the level of the squeezing run 20A of the upper caul belt and the lower infeed roll 54 is made level with the level of the squeezing run 21A of the lower caul belt to provide the precompression necessary for transition from a loose mat. The obtaining of a fairly even slope for this precompression curve can be assisted by use of an adjustable lead-in shoe 70 between the upper roll 53 and the upper stationary platen 25 as shown in FIG. 2. Such an adjustment can also be used for the lead-in from the lower roll 54.

Referring to the plywood pressure/time cycle indicated in FIG. 1, a momentary nip may be provided by the lead-in rolls 53–54 to insure initial intimate contact between the glue line and the veneer. Then the stationary press section 22 provides the heat transfer and pressure necessary to institute the curing process. This stage is followed by a substantially lower pressure in the caterpillar section 23 provided to prevent delamination or blow-out while the cure proceeds to the point of panel stability. During this second stage heating of the caterpillars will normally not be required particularly when the veneer has been preheated before reaching the continuous press.

Although the present invention has been described above and illustrated with a single stationary press section 22 and one caterpillar press section 23, this is by way of example only since additional press sections can be employed with the same pair of caul belts to carry out a given process wherein further pressure and/or temperature steps are required. For example, if two graduated pressure stages are desired after the stationary press section, then two caterpillar press sections can be placed in series running at the same speed but having their backing rails 43–44 loaded at different pressures and/or with their respective platens 24 at different temperatures. Collectively, these two caterpillar press sections would provide the driving force to pull the squeezing runs 20A–21A of the pair of caul belts through the stationary press section. Similarly, two stationary press sections can be placed in series with their respective platens 25–26 at different pressures and/or temperatures. Another alternative is to follow a set of stationary and press sections with a second such set. In this case the tensile stress in the caul belts would reduce to zero between the two sets and at the end of the second set after cresting at the discharge end of the stationary press sections of each set.

In the above description the platens of the press sections have been subjected to heating means. It is to be understood that this is also by way of illustration and that if desired for carrying out a given process the platens of one or more of the press sections can be cooled rather than heated.

Normally the caul belts 20–21 will be formed of stainless or high carbon steel, and the caterpillar platens 24 of a cast steel alloy giving a high coefficient of friction with the back of the caul belts. However, the platens 24 can also be coated or clad with facings providing the desired friction to exert the desired driving force on the caul belts.

The embodiments of the invention in which an exclusive property or privilege is claimed are defined as follows:

1. A continuous press comprising, a stationary press section, a caterpillar press section having its press opening coplanar with the press opening of the stationary press section, and a pair of movable opposed endless caul belts providing a linear squeezing run therebetween which passes through the press openings of said press sections and is driven by said caterpillar press section in opposition to the frictional reistance of said stationary press section.

2. A continuous press according to claim 1 in which said stationary press section comprises a pair of opposed flat platens bearing against the back of said caul belts, and means for heating said platens.

3. A continuous press according to claim 2 in which said caterpillar press section comprises a pair of opposed driven caterpillar tracks having flat platen links frictionally engaging the back of said caul belts and collectively providing a substantially continuous surface along said squeezing run.

4. A continuous press according to claim 1 in which said stationary press section comprises a pair of opposed flat platens having solid lubricant faces bearing against the back of said caul belts, and said caterpillar press section comprises a pair of opposed driven caterpillar tracks having flat platen links frictionally engaging the back of said caul belts, the coefficient of friction between said platen links and said caul belts being greater than the coefficient of friction between said solid lubricant faces and said caul belts.

5. A continuous press according to claim 4 in which lubricating means are provided for applying a lubricating film of a liquid compound between said solid lubricant faces and said caul belts which compound has the property of not forming a lubricating film when located between said platen links and the caul belts.

6. A continuous press according to claim 1 in which guide means are provided for guiding the return of said caul belts from said caterpillar press section to said stationary press section, said guide means including a pair of opposed pinch rolls arranged to nip said caul belts at the infeed end of said squeezing run.

7. A continuous press comprising, a pair of movable opposed endless caul belts providing a linear squeezing run therebetween, respective opposed nontraveling combination pressure applying and heating means for the belts each having a nontraveling heated flat pressure surface over which the back of the respective belt travels while traversing a tail portion of said run, respective opposed traveling combination pressure applying and belt driving means for the belts in front of said nontraveling means and each presenting an advancing flat pressure surface acting against the back of the respective belt in said run and by frictional engagement therewith pulling the belt over the respective said nontraveling pressure surface.

8. A continuous press according to claim 7 in which respective pressure means are provided for urging said opposed nontraveling means toward one another and for urging said opposed traveling means toward one another.

9. A continuous press according to claim 8 in which the pressure means for said opposed nontraveling means is independent of the pressure means for said opposed traveling means.

10. A continuous press according to claim 7 in which independent heating means are provided for directly heating said opposed traveling means.

11. In combination, a steel endless caul belt, a rigid nontraveling platen having a non-ferrous flat face pressed against the back of the belt along a linear run thereof, a run of an endless caterpillar track with flat steel platen links pressed against the back of said belt run in advance of said nontraveling platen and adapted to frictionally drive the belt in opposition to the frictional drag of said nontraveling platen face on the belt, and a liquid application on the back of the belt having the property of effectively lowering the coefficient of friction between the non-ferrous platen face and the steel belt without at the same time serving as a lubricant for the steel platen links on the steel belt.

12. The combination according to claim 11 in which said liquid comprises a polysiloxane and said nontraveling platen is faced with a solid lubricating material adapted to be lubricated by said polysiloxane.

13. A continuous press comprising, a pair of opposed endless caul belts providing a linear squeezing run therebetween, stationary squeezing pressure applying means frictionally loading the back of said belts in said run, and traveling belt driving means engaging said belts in said squeezing run and exerting thereon a linear pull sufficient to overcome the frictional loading of said stationary means without exerting any bending force on said belts at the end of the squeezing run.

14. A continuous press according to claim 13 in which said belt driving means exerts said linear pull over an extended longitudinal portion of the squeezing run wherein the belt tension is progressively reduced from a maximum tensile stress at the infeed end of said longitudinal portion to a negligible tensile stress at the outfeed end of such portion.

References Cited

UNITED STATES PATENTS

| | | | |
|---|---|---|---|
| Re. 22,200 | 10/1942 | Richardson | 100—154 X |
| 2,071,999 | 2/1937 | Dike | 144—281 |
| 3,325,859 | 6/1967 | Goldstein. | |

EDWARD L. ROBERTS, Primary Examiner

U.S. Cl. X.R.

18—4; 100—154; 144—281

PO-1050
(5/69)

UNITED STATES PATENT OFFICE
CERTIFICATE OF CORRECTION

Patent No. 3,521,552  Dated July 21, 1970

Inventor(s) Hans John Knapp

It is certified that error appears in the above-identified patent and that said Letters Patent are hereby corrected as shown below:

In the claims, claims 15, 16 and 17 should be added as follows:

15. A continuous press according to claim 6 wherein the return portion of said caul belts is in slack condition.

16. The combination according to claim 11 wherein said endless caul belt returning from said caterpillar track section to said non-traveling platen section is in slack condition.

17. A continuous press according to claim 13 wherein said endless caul belts returning from said traveling belt driving means to said stationary squeezing pressure applying means are in slack condition.

In the heading to the printed specification, line 7, "14 Claims" should read -- 17 Claims --.

Signed and sealed this 13th day of April 1971.

(SEAL)
Attest:

EDWARD M. FLETCHER, JR.
Attesting Officer

WILLIAM E. SCHUYLER, JR.
Commissioner of Patents